United States Patent Office 3,443,409
Patented May 13, 1969

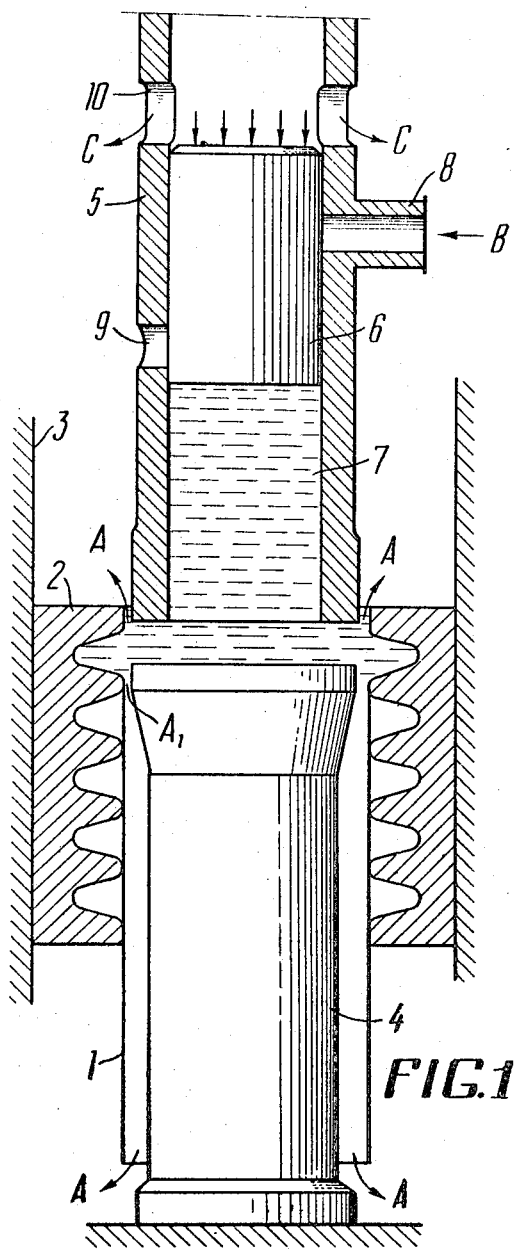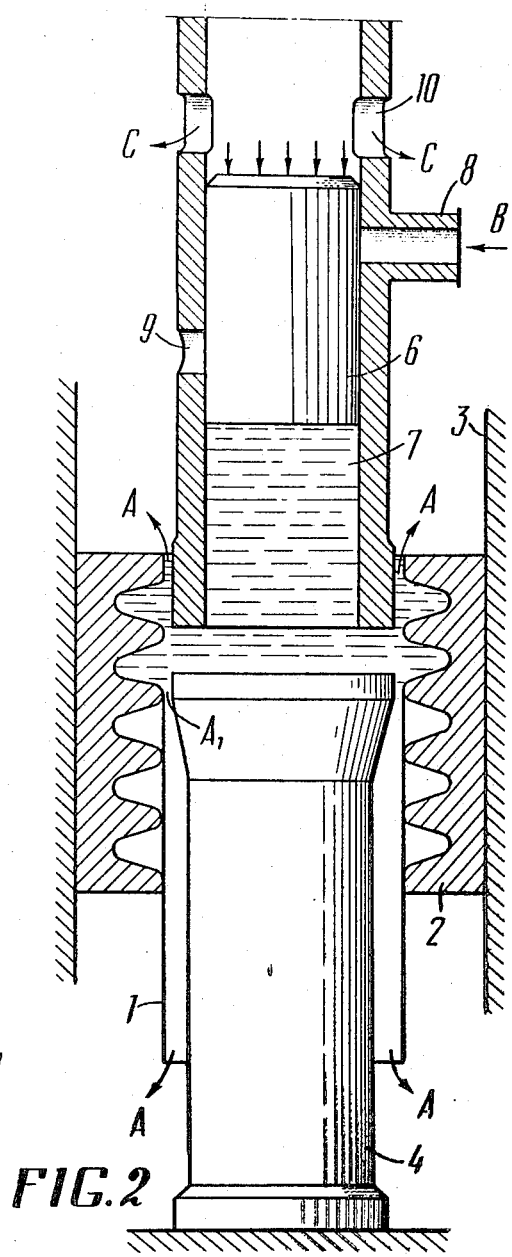
FIG.1
FIG.2

3,443,409
METHOD FOR HYDRODYNAMIC FORMING OF BELLOWS-TYPE ARTICLES AND A DEVICE FOR THEIR REALIZATION
Jury Georgievich Matsukin, Grebenikovskaja St. 5, Kharkov, U.S.S.R.
Filed Mar. 6, 1964, Ser. No. 349,852
Int. Cl. B21d 26/02, 28/18, 22/10
U.S. Cl. 72—56                                                    7 Claims The present invention relates to metal-working operations in general and, more particularly, to the method of hydrodynamic forming bellows-type shells and similar articles.

At present bellows-type articles are manufactured by methods of roll forming, bulging with a rubber punch, or by static hydraulic forming.

Devices for manufacturing bellows-type articles are also known, in which the energy of gas expansion is converted, by means of a ram, into the pressure of a liquid contained in a forming chamber.

Disadvantages of the known methods of manufacturing bellows-type articles are the necessity of sealing the forming chamber and forming the whole article in one operation. The latter condition brings about large frictional forces between the blank and the die, thus presenting difficulties in feeding the blank into the die and in limiting both the ranges of radii of curvature of the corrugation at its top and the shape of said corrugation.

Another significant disadvantage of hitherto known methods is a considerable complication of the manufacturing process in such cases when these methods are used for making articles from thick-walled blanks or blanks of high-strength alloys.

Although attempts have been made to overcome said disadvantages, none of them, as to the inventor's knowledge, proved successful.

Therefore, what I claim is not a method of manufacturing bellows-type articles intended for shaping all the corrugations of an article in a sealed forming chamber in one operation, but a method of hydrodynamic forming that provides for shaping bellows-type articles in steps within a non-sealed forming chamber and a device for same. It has been proved that the claimed method of hydrodynamic forming and the device for same permit to form bellows-type articles from thick-walled and thin-walled blanks with the radii of curvature of the corrugation at the top however small, to obtain articles with corrugations of intricate cross section and plan view, as well as articles from high-strength alloys.

In the broad sense, the present invention is intended for shaping bellows-type articles by means of a liquid impulse-loaded by the kinetic energy of a body travelling at a speed of 80 to 200 m./sec. or by any other energy impulse (for example, by a direct explosion within the liquid filling the forming chamber). The mode of flow of said liquid through openings of the non-sealed forming chamber is thereby caused to change, and there is a considerable rise in the hydraulic resistance, as offered by these openings due to their closing automatically with each hydraulic shock. This automatic closing contributes to increase the pressure up to a value as required for the forming process.

In accordance with the most preferable embodiment of this invention, the non-sealed forming chamber is provided inside the blank, surrounded by the die, and limited at one of its ends by a stop ram and at the opposite end, by a cylinder with a piston moving therein under the action of the energy of an explosion thus pressing on the liquid in the forming chamber.

It is an object of the present invention to shape bellows-type articles without specially sealing the forming chamber.

Another object of the present invention is to reduce the frictional forces that arise between the blank and the die when forming, and thus to provide for the unhindered motion of free portions of the blank.

Still another object of the present invention is to provide conversion of pressure, because that of the liquid in the forming chamber substantially exceeds the initial pressure of the gas in the gas chamber.

Yet another object of the present invention is to prevent the formation of any air cushion that would damp the impact of the fast-moving body, i.e. a piston, on the working liquid.

Among other objects of the invention, the safety for personnel should be noted which is provided by the localization of high pressure within the hydraulic chamber and the reduction of pressure inside the gas chamber.

In accordance with said and further objects, the invention relates to the new method and device for same as described here and below and claimed in the appended claims, with the understanding, however, that such changes in the exact embodiment of the invention, as disclosed in this specification, may be made, as fall within the spirit and scope of the present invention.

The objects and advantages of the invention will become apparent from the following description and the accompanying drawings in which:

FIG. 1 shows the device for hydrodynamic forming by means of impulse-loading the working liquid by a body, i.e. a piston, in rapid motion at the instant of forming the first corrugation of a multi-corrugated bellows-type article.

FIG. 2 shows the same device at the instant of forming the second corrugation.

Figure 3:
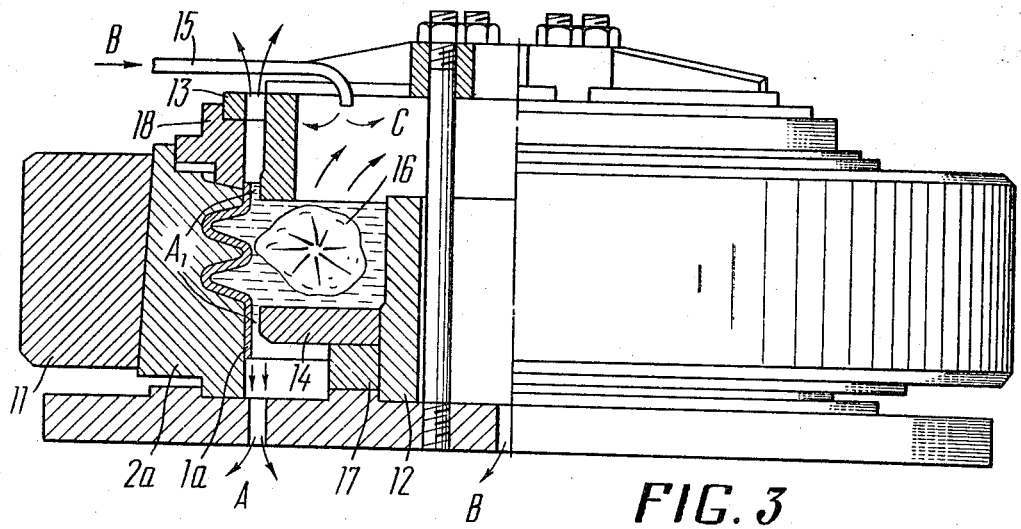
FIG. 3 shows the device for hydrodynamic forming by impulse-loading the working liquid through an explosion within the forming chamber, the device being shown at the instant of shaping the first corrugation.

In the hydrodynamic forming process employing the energy of a body in rapid motion (FIGS. 1 and 2), a tube blank 1 is placed into a die 2, the inner configuration of which corresponds to the outer shape of the article to be produced. Die 2 travels between the guides 3. The inner shape of the forming chamber is formed by the blank 1, a stop ram 4, a cylinder 5 in which travels piston 6.

The working liquid 7 entering the forming chamber through a pipe branch 8 remains at a constant level determined by the location of an overflow opening 9 which admits the air escape. Thereby any damping of the impact produced by the piston 6 upon the liquid 7 is excluded. Openings 10 provide outlet for explosion gases.

Before the forming operation starts, the liquid 7 flows out from the forming chamber through clearances in the direction shown by arrows A in the drawings, this leakage being insignificant due to a low hydrostatic pressure. Said leakage is made up by a constant inflow of said liquid through the pipe-branch 8 in the direction shown by arrows B. The direction of exhaust of explosion gases at the end of operation is shown by arrows C.

In forming operation, the piston 6 that travels at a high speed, shuts the overflow 9 after having forced out the air through it, and then impacts on the working liquid 7. To impart the required speed to the piston 6, either the energy of compressed gases, or the explosion energy, or the energy of combustion products of some air-fuel mixtures may be employed.

The impact is accompanied by the hydraulic closing of clearances $A_1$ and the conversion of pressure: the pressure, set up in the working liquid 7, may considerably exceed the gas pressure in the gas chamber. Under the action of pressure in the forming chamber, the shaping of the specified element of a blank is effected since the cylinder 5 and stop ram 4 precisely limit the specified or working portion of the blank which is directly subjected to the impulse loading in the forming operation with the free portion of the blank remaining practically unloaded. Thereby a reduction of frictional forces between the blank and the die is provided, and the axial displacement of the blank ends is increased when the corrugations are being formed.

In order to shape the next element or corrugation of the article, the die 2 with the blank 1 in it is shifted for the required distance along the guides 3 with the forming operation repeated as described above.

Figure 4:
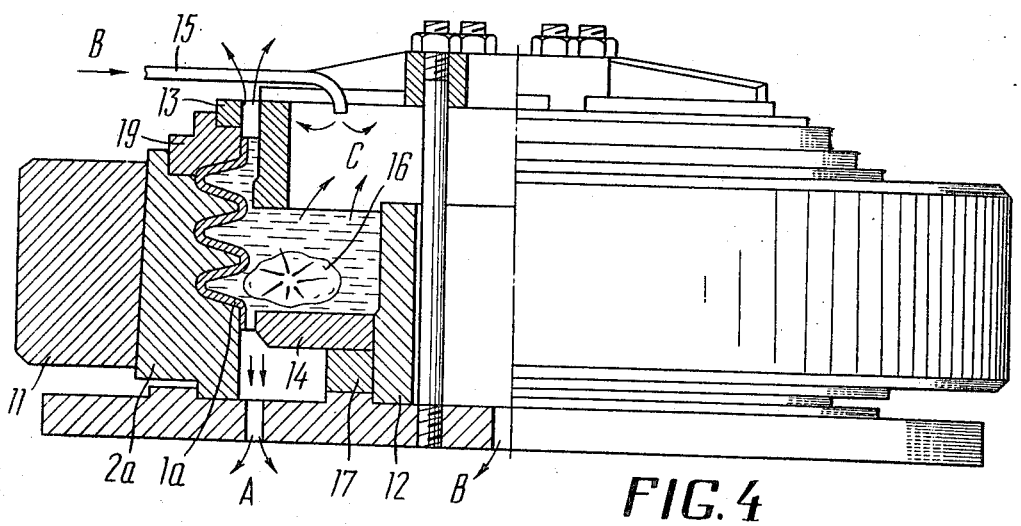
FIG. 4 shows the same device at the instant of forming the next corrugation.

When large articles are to be produced by the hydrodynamic forming method, the energy of an explosion in the working liquid can be directly utilized. In such a case (see FIGS. 3 and 4), the use of a cylinder and a piston becomes unnecessary. The blank 1a is placed into a split die 2a, the halves of which are secured together by a binding ring 11. The working liquid fills up the forming chamber limited by the blank 1a, an inner sleeve 12, a top sleeve 13, and a stop flange 14, and stands at a constant level, this level being maintained through compensating the leakage (in the direction of A) by a constant inflow of the liquid (in the direction of B) through the pipe 15.

The rise in pressure of the working liquid up to the required value is effected by an explosion, made in the region 16. In this case, a zone of loading, applied to the blank 1a, is limited by an interchangeable spacer 17 and the top sleeve 13, the free portion of the blank undergoing no deformation, and thus no frictional forces arising between the blank and the die 2a.

In order to form the next corrugation of the article, the blank 1a is relatively shifted the required distance before disassembling the die halves, the ring 18 being replaced by the safety ring 19, the die halves being reassembled and the forming operation repeated.

Figure 5A:
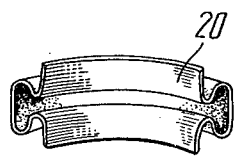
FIGS. 5a–5c illustrate various bellows-type articles, as produced by the hydrodynamic forming method.
Figure 5B:
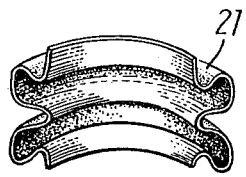
Figure 5C:
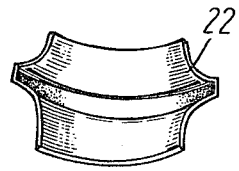

The present invention may be employed, in particular, for manufacturing bellows-type articles as illustrated in FIGS. 5a–5c with corrugations of intricate cross-section 20, including articles with asymmetric corrugations 21 and with small radii of curvature of the corrugation at its top, as well as for forming said articles from both thin-walled and thick-walled blanks, or from high-strength alloys.

It should be noted that the present invention provides localization of the portion of the blank to be loaded, which brings about the reduction of the frictional forces arising between the die and the blank, and, as a result, makes it possible to manufacture bellows-type articles with features described above.

The present invention makes it possible to manufacture bellows-type articles in a non-sealed forming chamber.

In addition, the present invention admits of the conversion of pressure, on account of which the pressure of the working liquid considerably exceeds the gas pressure in the gas chamber, which fact, in its turn, ensures the safety of the manufacturing process.

Moreover, the invention makes it possible to eliminate any damping of the impact of a body in rapid motion with the working liquid due to air escape through the overflow opening which controls the level of the working liquid in the forming chamber.

What is claimed is:
1. A method of forming bellows-type shells from tubular metal blanks, comprising positioning such a blank in a die having an internal configuration of a shape to be imparted to the blank, delimiting a pressure liquid-accommodating chamber having axially spaced horizontal surfaces and bounded in part by said die, feeding liquid into such chamber while permitting escape of a portion of such liquid from the lower end of such chamber so that such chamber is in unsealed condition, continuing the feeding of liquid into the chamber at a rate sufficient to maintain liquid therein over an axial extent at least coextensive with the length of an initial portion of the blank to be deformed, and suddenly applying kinetic energy to the liquid within the chamber to hydraulically close such chamber and deform such initial portion of the blank.

2. The method as claimed in claim 1 and thereafter effecting axial shifting of the blank relative to the horizontal level at which liquid escapes from such chamber and repeating such application of energy to deform another length of such blank.

3. The method as claimed in claim 1 and thereafter shifting such die and blank relative to the level at which liquid escapes from such chamber, continuing the feeding of liquid within the chamber to maintain the required level therein and repeating such application of energy to deform another length of such blank.

4. Apparatus for hydrodynamically forming bellows-type metal shells, comprising an annular die means having an internal configuration of the shape to be imparted to such a shell and adapted to receive a tubular blank therewithin, means defining within such die means an upper horizontal surface delimiting the lower end of a liquid-accommodating chamber, said means having at least a portion thereof laterally spaced from such die and positioned blank to permit liquid to escape from such chamber, cylindrical means extending within such die and having a lower horizontal rim delimiting at least a part of the upper portion of such chamber, said cylindrical means being laterally spaced from such die, means for feeding liquid into such chamber at a rate sufficient to maintain liquid therein over an axial length of such die means coextensive with an initial portion of the blank to be deformed, such portion being positioned between said lower horizontal surface and the rim, and means for suddenly applying kinetic energy to such liquid to hydraulically close such chamber and deform a portion of such blank.

5. Apparatus as claimed in claim 4 and in which a fixed ram having an upper surface defines said upper horizontal surface delimiting the lower end of such liquid-accommodating chamber, said cylindrical means comprising a cylinder, the external dimensions of said cylinder and ram being such in relation to the internal dimensions of the die means as to provide liquid escape passages along the internal surface of the blank and die means, said cylinder having a liquid outlet therein, the means for feeding liquid into such chamber being located above such outlet whereby continual feeding of liquid into the cylinder maintains a constant liquid level therewithin at the level of such outlet despite the escape of a portion of the liquid, and a piston within said cylinder and movable from a position above the point of communication of the feeding means with said cylinder toward the liquid within the chamber whereby when kinetic energy is suddenly imparted to such piston any air trapped in the cylinder escapes through the liquid outlet and such liquid is subjected to compression to hydraulically close such chamber and simultaneously deform an initial portion of the blank located between the upper surface of the ram and the lower rim of the cylinder.

6. Apparatus as claimed in claim 4 further including a guide means externally of said die means, said die means being shiftable axially along said guide means, a fixed ram having an upper surface defining said upper horizontal surface delimiting the lower end of such liquid-accommodating chamber, said cylindrical means comprising a cylinder, the external dimensions of said cylinder and ram being such in relation to the internal dimensions of the die means as to provide liquid escape passages along the internal surface of the blank and die means, said cylinder having a liquid outlet therein, the means for feeding liquid into such chamber being located above such outlet whereby continual feeding of liquid into the cylinder maintains a constant liquid level therewithin at the level of such outlet despite the escape of a portion of the liquid, and a piston within said cylinder and movable from a position above the point of communication of the feeding means with said cylinder toward the liquid within the chamber whereby when kinetic energy is suddenly imparted to such piston any air trapped in the cylinder escapes through the liquid outlet and such liquid is subjected to compression to hydraulically close such chamber and simultaneously deform an initial portion of the blank located between the upper surface of the ram and the lower rim of the cylinder.

7. Apparatus as claimed in claim 4 in which a sleeve member has a lower rim defining at least a part of the upper limit of such chamber, and a flange member having a horizontal extent within the die, the upper surface of the flange of which defines the horizontal surface delimiting the lower surface of such chamber.

References Cited

UNITED STATES PATENTS

| | | | |
|---|---|---|---|
| 1,565,062 | 12/1925 | Cotton | 72—61 |
| 1,879,663 | 9/1932 | Dreyer | 72—62 |
| 2,743,691 | 5/1956 | Cuq | 72—62 |
| 2,960,141 | 11/1960 | Rutter | 72—62 |
| 3,045,339 | 7/1962 | Callahan | 72—56 |
| 3,141,496 | 7/1964 | Yowell et al. | 72—56 |

RICHARD J. HERBST, *Primary Examiner.*

U.S. Cl. X.R.

72—62